Nov. 23, 1965  C. F. SMITH  3,219,399
BEARING
Filed Oct. 29, 1962  3 Sheets-Sheet 1
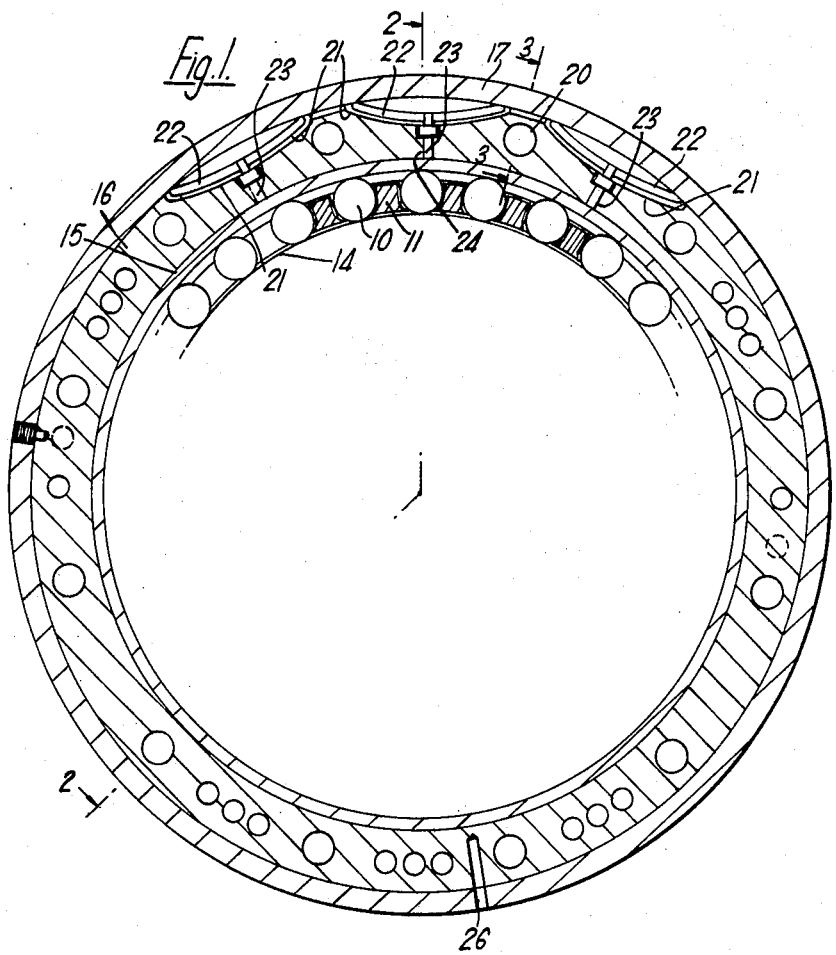
Inventor
Colin Frederick Smith
By
Cushman, Darby & Cushman
Attorneys Nov. 23, 1965 C. F. SMITH 3,219,399
BEARING
Filed Oct. 29, 1962 3 Sheets-Sheet 2
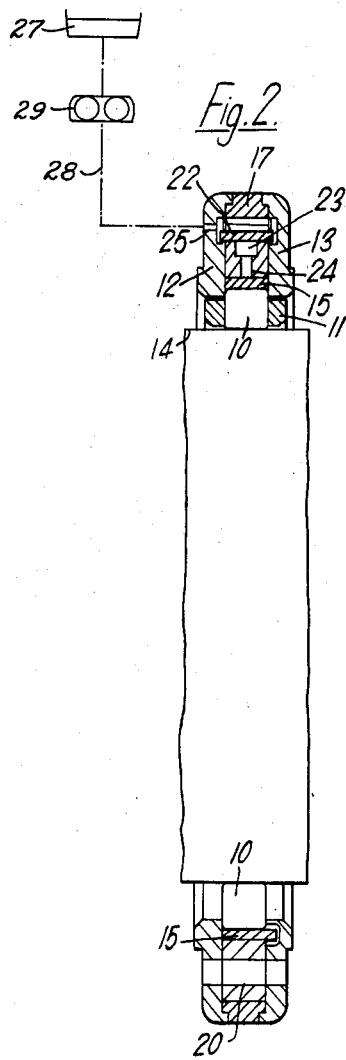
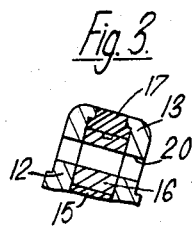
Inventor
Colin Frederick Smith
By
Cushman, Darby & Cushman
Attorneys

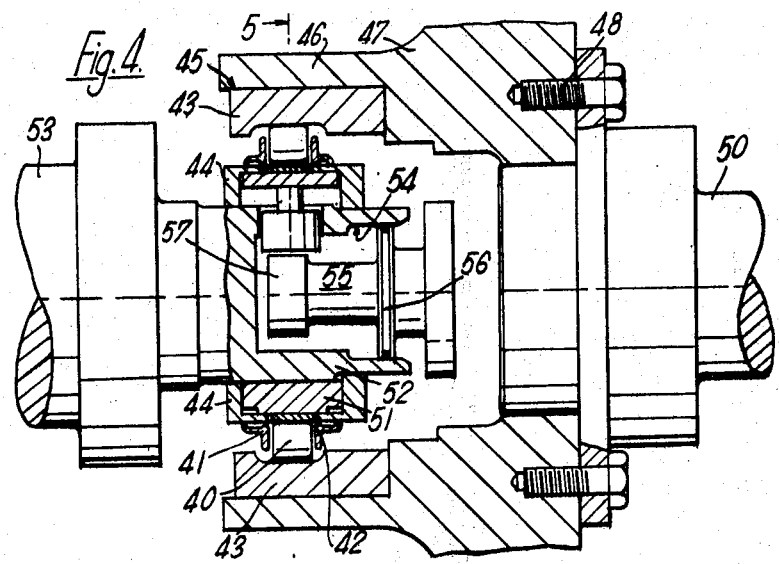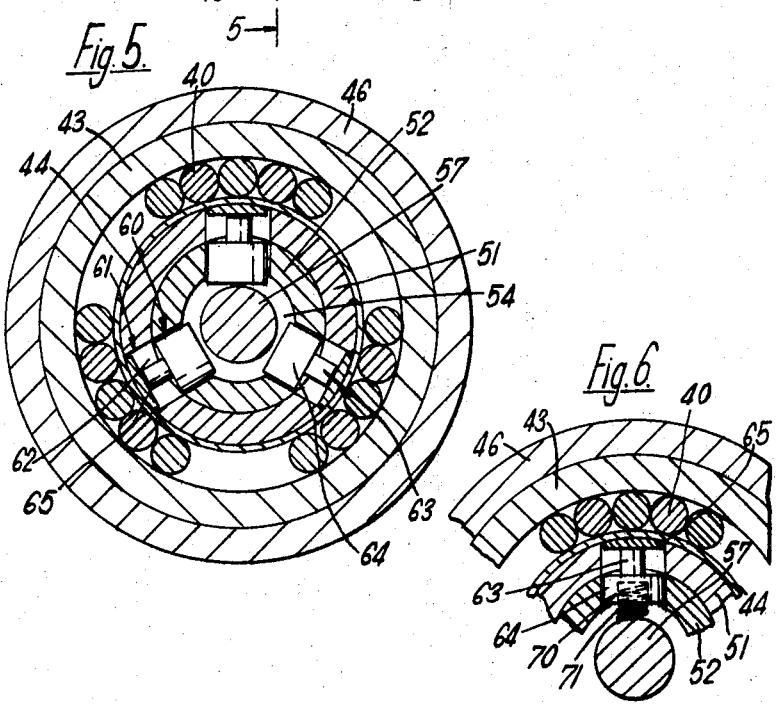

United States Patent Office 3,219,399
Patented Nov. 23, 1965

3,219,399
BEARING
Colin F. Smith, Derby, England, assignor to Rolls-Royce Limited, Derby, England, a company of Great Britain
Filed Oct. 29, 1962, Ser. No. 233,779
Claims priority, application Great Britain, Nov. 3, 1961, 39,534/61
9 Claims. (Cl. 308—184)

This invention concerns bearings and, although it is not so restricted, is more particularly concerned with a high speed roller bearing within which may be mounted the main shaft of a gas turbine engine.

In such a high speed roller bearing, the steady operating loads on the bearing are comparatively light and the said main shaft tends to have an erratic and intermittent radial motion within the bearing clearance. It is found that appreciable cage slip occurs, i.e. the cage and roller assembly of the bearing rotates at a speed appreciably below the theoretical epicyclic speed at most operating conditions.

Such cage slip and erratic shaft motion may cause excessive wear and deterioration of the components of a conventional roller bearing, and particularly of the inner race and rollers thereof. Both wear and erratic shaft motion have been found most troublesome in bearings having a large clearance between the rollers and the races, this clearance being necessitated by or resulting from differential expansions of the inner and outer races.

According to the present invention there is therefore provided a bearing comprising rolling elements disposed between and in rolling contact with an inner and an outer race, at least one of the said races being flexible and so loaded by displaceable loading means that a non-circular track is formed for the rolliing elements, successive portions of the track forming an interference fit and having a clearance with the rolling elements.

The term "rolling elements" as used in this specification is intended to include bearings such as ball bearings, roller bearings and needle bearings.

Preferably, the arrangement is such that any eccentric loading set up during use of the bearing is accommodated by the non-circular track displacing said displaceable loading means.

The displaceable loading means may be constituted by a plurality of plungers which are adapted to bear against said flexible race. Thus each of said plungers may bear against said flexible race through an arcuate shoe which distributes the load exerted by said plunger over a predetermined arc of said flexible race.

Preferably the plungers are spring biased towards said flexible race.

The dispaceable loading means may load said flexible race by centrifugal force when the bearing is in use. Thus the flexible race may be the inner race, the displaceable loading means comprising relatively heavy plungers freely slidable within radial bores adjacent said flexible race.

Preferably there are three plungers equi-spaced about said flexible race and acting upon it, when the bearing is in use to form a non-circular track.

In a preferred embodiment, the inner race may be carried by a shaft and the outer race is mounted within a housing, damping means being provided for damping radial movement of the shaft with respect to the housing. Thus said damping means may comprise means for providing a film of oil between said shaft and the inner race and/or between the outer race and the housing.

The invention also includes within its scope a gas turbine engine having a main shaft provided with a bearing as set forth above.

The invention is illustrated, merely by way of example, in the accompanying drawings, in which:

FIGURE 1 is a sectional view of a bearing according to the present invention,

FIGURES 2 and 3 are sections taken respectively on the lines 2—2 and 3—3 of FIGURE 1, FIGURE 4 is a part-sectional view of a further bearing according to the present invention, FIGURE 5 is a sectional view of the bearing of FIGURE 4, taken on the line 5—5 of that figure, and FIGURE 6 is a view of part of the bearing of FIGURES 4 and 5, illustrating a modified form of that bearing.

Referring to FIGURES 1–3 of the drawings, a high speed roller bearing within which may be journalled the main shaft (not shown) of a gas turbine engine comprises rollers 10 which are mounted within a cage 11, the cage 11 being mounted between annular end wall members 12, 13.

The rollers 10 are disposed between and in rolling contact with an inner race 14, which is carried by the said main shaft, and a flexible outer race 15 whose radial thickness may be sufficient to permit its outer surface to be case hardened.

The flexible outer race 15 is mounted within an annular housing member 16 from which the outer race 15 is spaced by a vary small annular gap (not shown). The housing member 16 is mounted within an annular casing member 17.

Aligned holes 20 are provided in the end wall members 12, 13 and the housing member 16 to permit these parts to be bolted together.

The housing member 16 is provided with three angularly spaced apart recesses 21 within each of which there is disposed a semi-elliptic spring 22 whose outer ends bear against the casing member 17.

Each of the springs 22 bears against a displaceable stud, or plunger, 23 which is mounted in an aperture 24 in the housing member 16. Each stud 23 bears against the flexible outer race 15, an angle of 60° being included between the axes of the outermost studs 23.

The middle stud 23 is spaced from its aperture 24 by a very small clearance (not shown) which communicates with the above-mentioned annular gap between the housing member 16 and the outer race 15. The said clearance also communicates with an oil feed hole 25 in the end wall member 12. An oil reservoir 27 is connected to oil feed hole 25 by a pipe 28. An oil pump 29 is provided in the pipe 28 for pumping oil to the annular gap.

A hole 26, which extends through the casing member 17 and housing member 16, is adapted to receive a thermocouple by means of which the temperature of the bearing may be determined.

In operation, the springs 22 serve, via the studs 23, to impart a radially inwardly directed load to a 60° arc of the flexible outer race 15. This has the effect of distorting the outer race 15 to an approximately elliptical shape and of reducing slip between the rollers 10 and the races 14, 15, without imposing appreciable bending fatigue loading on the flexible outer race 15.

Any eccentric loading set up in use, due to additional loads on the said main shaft for example, is accommodated by the flexible race 15 displacing the displaceable studs or plungers 23 against the springs 22.

The film of oil supplied to the annular gap between the housing member 16 and the outer race 15 effects "squeeze-film" damping of any movements of the outer race 15 which may be caused by radial movement of the said main shaft with respect to the housing member 16. A film of oil may be supplied to the space between the shaft and the inner race 14 in place of or in addition to the film of oil between the housing 16 and the outer race 15 to provide further "squeeze-film" damping.

Referring now to FIGURES 4 and 5, there is shown in these figures a roller bearing disposed between two rotatable shafts. The bearing comprises rollers 40 mounted within annular cage members 41, 42 and in rolling contact with a rigid outer race 43 and a flexible inner race 44.

The rigid outer race 43 is fixed within a hole 45 formed by an annular flange 46 of a support housing 47. The support housing 47 is rigidly secured by bolts 48 to an end of a rotatable shaft 50 of a gas turbine engine.

The flexible inner race 44 surrounds an annular member 51 which is secured to an annular flange 52. The annular flange 52 forms an extension of a rotatable shaft 53, which is coaxial with the rotatable shaft 50.

The annular flange 52 provides a hole 54 within which is mounted a shaft 55. The shaft 55 is centrally situated within the hole 54 by a flange 56 which bears against the annular flange 52. The innermost end of the shaft 55 is provided with an enlarged cylindrical abutment 57 which is radially aligned with the rollers 40.

The annular flange 52 is provided with three equi-spaced radially extending apertures 60, and the annular member 51 is also provided with three equi-spaced radially extending apertures 61. The pairs of apertures 60 and 61 are aligned with one another to form three radially extending apertures 62.

Freely slidable within the apertures 62 are three plungers 63, each provided at one end with a heavy flange portion 64. The other end of each plunger 63 is adapted to bear against an arcuate shoe 65. Three arcuate shoes 65 are provided, and these distribute the load imposed by the plungers 63 upon the flexible inner race 44 over a predetermined arc of the race.

The plungers 63 are prevented from falling out of the apertures 62 by the cylindrical abutment 57, which is disposed closely adjacent the innermost faces of the heavy flange portions 64.

In use, rotation of the shaft 53 will cause the plungers 63, which are relatively heavy due to their heavy flange portions 64, to move radially outwardly under the action of centrifugal force. As the speed of rotation increases, so the force with which the plungers 63 are moved outwardly increases. The plungers exert forces on the arcuate shoes 65 and thus onto the flexible inner race 44. Due to these forces, the inner race becomes deformed. Thus the track for the rollers 10 becomes non-circular, and slip between the rollers 40 and the races is reduced. Also, the deformation becomes greater with increased speed of rotation and thus the increase in slip as the speed of rotation increases is opposed by a corresponding increase in loading forces preventing slip.

It will be appreciated that at low speeds, there will be relatively little force exerted on the flexible inner race 44 by the plungers 63, and thus little opposition to slip is provided. Normally this is quite adequate since slip is quite small at low speeds. However, if it is required to prevent slip even at low speeds, then the arrangement shown in FIGURE 6 can be used.

Referring to FIGURE 6, this arrangement is similar to that shown in FIGURES 4 and 5, and for this reason like components have been given like reference numerals in both cases. This arrangement differs from that of FIGURES 5 and 6 in that the heavy flange portions 64 are provided with centrally positioned holes 70 within which are retained helical springs 71. The helical springs 71 rest on the cylindrical abutment 57, and so are prevented from falling out of the holes 70.

The helical springs 71 bias the plungers 63 toward the flexible inner race 44 and cause the plungers 63 to exert a loading force on the flexible inner race at all times. Thus, even at low speeds the flexible inner race 44 is loaded, and assumes a non-circular form and thus slip is opposed.

Any eccentric loading set up in use with the bearings shown in FIGURES 4–6 is accommodated by the flexible race 44 displacing the plungers 63 radially inwardly against the centrifugal force and, in the FIGURE 6 embodiment, against the force of springs 71 as well.

It will be appreciated that although the embodiments described with reference to FIGURES 4–6 are for intershaft bearings, the arrangements could equally well be used with the outer race housed in a static housing.

Also, it will be appreciated that in the embodiment described with reference to FIGURES 1–3 the plungers 23 need not bear directly on the flexible outer race 15 but could bear upon arcuate shoes, similar to those, denoted 65 in FIGURES 4–6. Again, three separate arcuate shoes need not be used for the plungers 23, but a single arcuate shoe, common to all three plungers 23 could extend over, say, 60° of the flexible outer race 15.

I claim:

1. A bearing comprises a shaft an inner race carried by said shaft, a housing, a flexible outer race mounted within said housing, said housing having a peripheral surface supporting said flexible race over a major portion of its periphery damping means being provided for damping radial movement of the shaft with respect to the housing, rolling elements disposed between and in rolling contact with said inner race and said outer race, and displaceable loading means loading said flexible race in a direction opposite to a direction of support by said housing and providing a non-circular track for the rolling elements, successive portions of the track forming an interference fit and having a clearance with the rolling elements.

2. A bearing as claimed in claim 1 in which said damping means comprises means for providing a film of oil between said shaft and the iner race.

3. A bearing as claimed in claim 1 in which said damping means comprises means for providing a film of oil between the outer race and the housing.

4. A bearing comprising two concentric radially spaced races, at least one of which is flexible, and rotatable rolling elements disposed between and in rolling contact with said races, a member disposed adjacent said flexible race and provided with radial bores, radially displaceable relatively heavy plungers freely slidable within said radial bores and loading said flexible race by centrifugal force when said flexible race rotates and thus providing a non-circular track for rolling elements.

5. A bearing comprising two concentric radially spaced races, at least one of which is flexible, and rotatable rolling elements disposed between and in rolling contact with said races, a member disposed adjacent said flexible race and provided with radial bores radially displaceable relatively heavy plungers freely slidable within said radial bores and loading said flexible race by centrifugal force when said flexible race rotates and thus providing a non-circular track for the rolling elements, successive portions of the track forming an interference fit and having a clearance with the rolling elements.

6. A bearing comprising an outer race and a flexible inner race, rotatable rolling elements disposed between and in rolling contact with said races, a member disposed within and adjacent said flexible inner race and provided with three equi-spaced radial bores three radially displaceable relatively heavy plungers freely slidable within said three radial bores said plungers bearing upon and loading said flexible inner race by centrifugal force when the flexible inner race rotates, thus providing a non-circular track for the rolling elements.

7. A bearing comprising an outer race and a flexible inner race, rotatable rolling elements disposed between and in rolling contact with said races, a member disposed within and adjacent said flexible inner race and provided with spaced radial bores, radially displaceable relatively heavy plungers freely slidable within said radial bores arcuate shoes provided between said plungers and said flexible inner race, the plungers bearing upon said arcuate shoes and thus loading the flexible inner race by centrifugal force as the flexible inner race rotates, thus providing a non-circular track for the rolling elements, the arcuate shoes distributing the radial load exerted by the plungers over predetermined areas of the flexible inner race.

8. A bearing comprising a shaft, a flexible inner race mounted on said shaft, a support member positioned between said shaft and said flexible inner race for supporting said flexible inner race along its periphery, an outer race radially spaced from said inner race, a housing in which said outer race is supported, rolling elements disposed between and in rolling contact with said inner and outer races, and plungers freely slidable within radial bores provided in said support member adjacent said flexible inner race, upon rotation of the shaft said plungers moving radially outwardly under centrifugal force, thus loading the flexible inner race and providing a non-circular track for the rolling elements, successive portions of the track forming an interference fit and having a clearance with the rolling elements.

9. A bearing as claimed in claim 8 comprising compression springs provided within said radial bores and urging said plungers against said flexible inner race.

References Cited by the Examiner

UNITED STATES PATENTS

| 1,978,707 | 10/1934 | Gibbons | 308—207 |
| 2,631,901 | 3/1953 | Holben | 308—184 X |
| 2,916,336 | 12/1959 | Andreini | 308—207 |
| 3,001,840 | 9/1961 | Musser | 308—188 X |
| 3,009,748 | 11/1961 | Pitner | 308—207 |

FOREIGN PATENTS 1,118,308  3/1956  France.

DON A. WAITE, *Primary Examiner.*

FRANK SUSKO, *Examiner.*